UNITED STATES PATENT OFFICE.

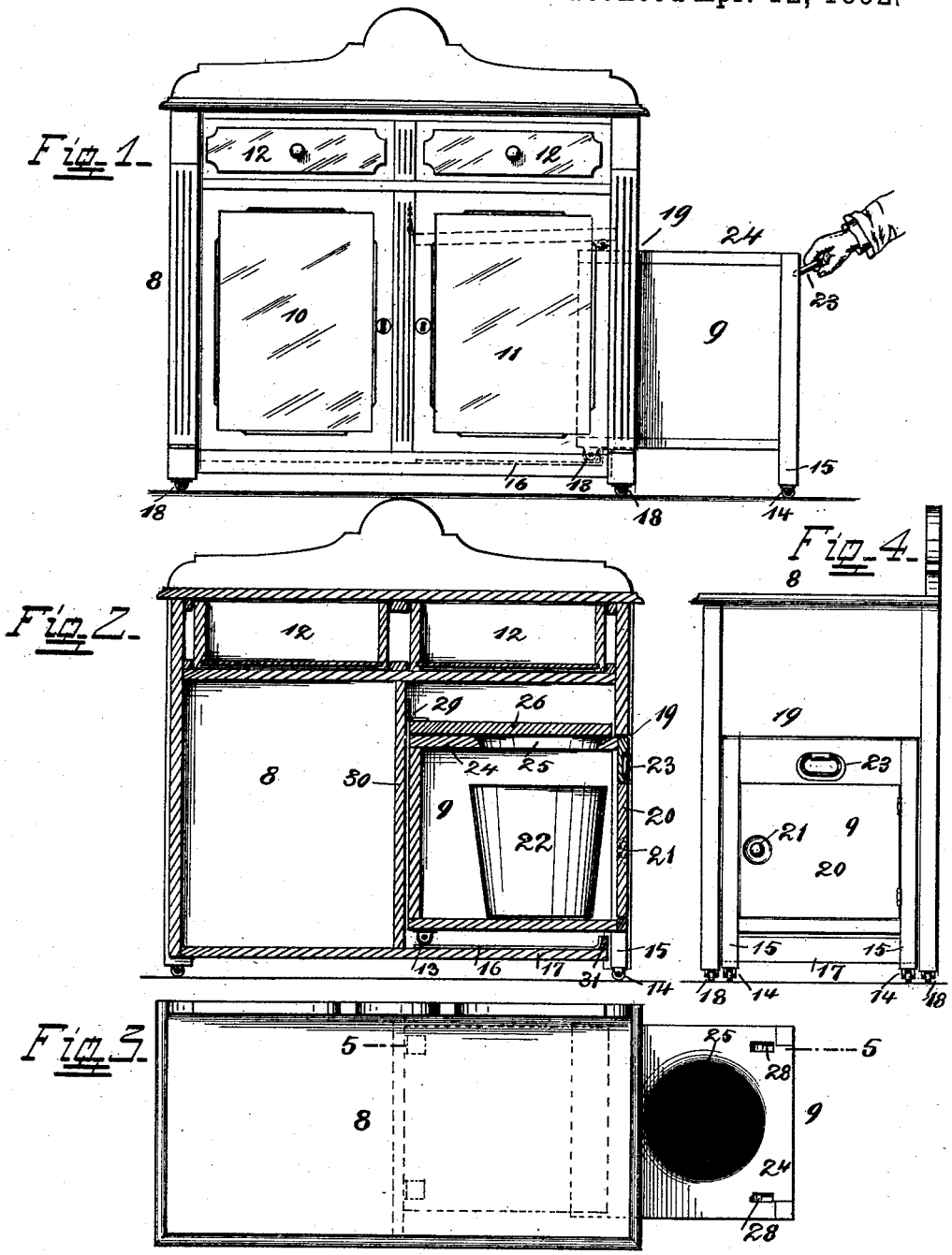

LOUIS R. LEWING, OF CINCINNATI, OHIO.

COMBINATION WASH-STAND AND CLOSE STOOL.

SPECIFICATION forming part of Letters Patent No. 472,673, dated April 12, 1892.

Application filed June 17, 1891. Serial No. 396,604. (No model.)

*To all whom it may concern:*

Be it known that I, LOUIS R. LEWING, a citizen of the United States, residing at Cincinnati, in the county of Hamilton and State of Ohio, have invented a certain new and useful Combination Wash-Stand and Close Stool; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to combination-furniture and particularly to a wash-stand combined with a close stool; and the novel features reside in the specific construction used in connection therewith, all of which is explained and pointed out in the following specification and claim and illustrated in the accompanying drawings, in which—

Figure 1 is a front view of a wash-stand of customary pattern, showing close stool in ready position for use. Fig. 2 is a vertical longitudinal section through wash-stand and close stool, showing the latter in its position within the former. Fig. 3 is a top view of wash-stand and close-stool parts in position, as shown in Fig. 1. Fig. 4 is a view of that end of the wash-stand at which the close stool is located. Fig. 5 is a longitudinal section through the top of the close stool and its lid, the same taken on line 5 5 of Fig. 3 and while the parts are in position, as shown in Figs. 1 and 3.

8 is a wash-stand of suitable design, and 9 the close stool, occupying in its normal position about one-half of the former.

10 and 11 are customary doors in the wash-stand, and 12 12 are suitable drawers in the same. Door 11 is a blind-door and does not open, it being provided merely to preserve the symmetrical appearance of the wash-stand and to hide the close stool. The latter is located in that part of the wash-stand which is directly behind this door and rests and slides on rollers 13 and 14, the former secured to its under side, the latter attached to legs 15, secured to the front or visible side of the close stool. Rollers 13 move on tracks 16, supported on the floor 17 of the wash-stand. Legs 15 of the close stool are of such a height as to bring rollers 14 down to the floor and even with the ordinary rollers 18 of the wash-stand, so as to support the close stool in a level position and cause it to move properly when pulled out from its recess within the wash-stand. Parts of one side of the wash-stand at 19 are cut away to permit the close stool to pass in and out, the latter's front fitting this cut-out portion of the wash-stand and closing and completing its side when pushed back to its normal position.

20 is a door in the front of the close stool provided with a knob 21, and gives access to the interior and to a vessel 22, located therein.

23 is a handle secured, also, to the front of the close stool and serves as a means by which the latter may be conveniently pulled out in position. Handle 23 and knob 21 are located and secured within recesses in the front and door of the close stool, so as to prevent them from projecting out above the surface of the side of the wash-stand and being noticed from the front by casual observers.

24 is the top of the close stool, provided with an opening 25, which latter is closed and covered by a lid 26 when the former is not in use and in its normal position within the wash-stand, in which position rollers 27, secured to the under side of said lid, rest in recesses 28 in the top of the close stool. When the latter is pulled out for use, these rollers slide out of their recesses and lift the lid somewhat off of the top of the close stool, and thereby lessen the friction which would otherwise be caused if the lid would rest direct on top of the close stool while the latter is moved in and out. (See Fig. 5.) Lid 26 is kept in position by hinges 29, securing it to a partition 30, which latter also separates the close-stool compartment from the balance of the wash-stand. As will be seen, the lid closes and uncovers the close stool automatically, the mere change of position of the latter accomplishing this result, which I consider a great convenience, inasmuch as it saves from handling the lid separately.

31 is a stop at the outer ends of tracks 16, whereby the close stool is prevented from being pulled out too far.

Having described my invention, I claim as new—

A combined wash-stand and close stool, the latter sliding within the former, its inner end being supported within the wash-stand and its outer end resting on the floor, provided with a lid secured to the interior of the wash-stand, said lid being provided with rollers on its under side, which rest in recesses in the top of the close stool when the latter is in its normal position and when pulled out raise the lid off the top to lessen the friction, all as substantially shown, and for the purposes described.

In testimony whereof I affix my signature in presence of two witnesses.

LOUIS R. LEWING.

Witnesses:
CARL SPENGEL,
C. E. PRIOR.